Dec. 6, 1927.

C. SANDBERG 1,651,555

GRAVEL SCREEN AND CLEANING DEVICE THEREFOR

Filed May 8, 1926

INVENTOR
Carl Sandberg
BY
ATTORNEYS

Patented Dec. 6, 1927.

1,651,555

UNITED STATES PATENT OFFICE.

CARL SANDBERG, OF BATTLE CREEK, MICHIGAN.

GRAVEL SCREEN AND CLEANING DEVICE THEREFOR.

Application filed May 8, 1926. Serial No. 107,598.

The object of the invention is to provide a simple construction of gravel screen which will be self-cleaning.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which.

Figure 1:
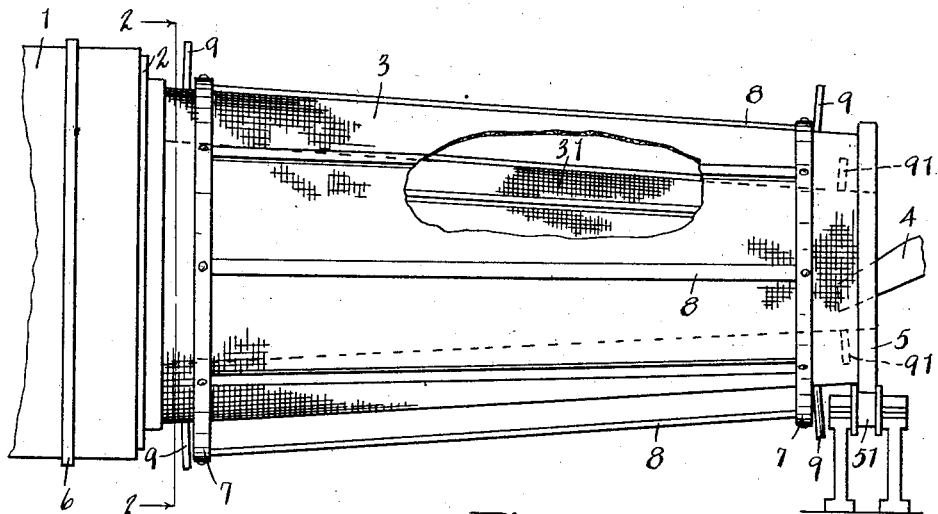
Fig. 1 is a side elevation view of the feed screen section of one of my improved screen structures having part of the outer screen broken away.
Figure 2:
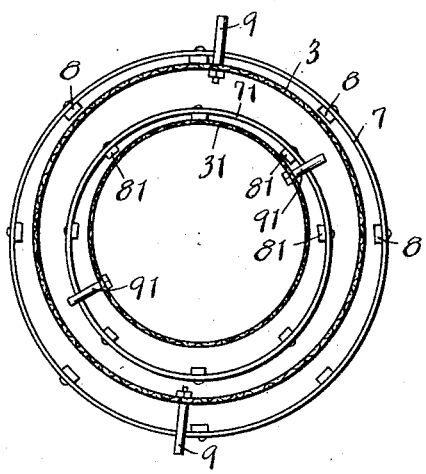
Fig. 2 is a cross sectional view on line 2—2 of Fig. 1.

Referring to the drawing, 1 is the end of a main screen drum. 2 is the head therefor. 3 is the feed screen section of such drum which may be multiple or duplex as shown and may be tapered or straight. 4 is the trough for delivering gravel to this feed screen. 5 is the supporting rim carried on suitable rollers 51. 6 is the supporting ring on the main drum similarly carried in practice.

7, 7 are end rings of the cleaner which embrace the exterior of the tapered feed screen drum. These are connected by longitudinal cleaner bars 8 at intervals. I show eight of these bars but a mere plurality is sufficient for most purposes, adapted to contact longitudinally on the upper side of the drum as it revolves. The ring is kept in position on the outside of the screen by projecting guide pins 9 at each end.

31 is the inner screen drum of the multiple screen which is also tapered and supported at the heads in the usual way of supporting such multiple screens. The screen 31 is disposed axially within the screen 3. Rings 71 for the cleaner are at each end precisely comparable to the rings 7 at the exterior. These are connected by a plurality of longitudinal bars 81 comparable to the bars 8, and these are preferably guided in effective position by projecting pins 91 comparable to pins 9, although from the fact that they are disposed between the two screens it would be impossible for this structure to become dislocated. The pins are of advantage in that behalf.

In operation, when gravel is fed into this feed screen, which is revolved by suitable means in the usual way, when the screen becomes clogged at any point it will eventually pass under one of the longitudinal bars 8 or 81 when the clog will be pressed out of the screen and dropped down to the bottom again so that it can be advanced with the mass.

The rings at the end of the screen being larger than the screen cause each bar to advance and contact with a different area of the screen at each revolution, thereby completely covering and forcing the gravel out of and cleaning every part of the screen during a sufficient number of revolutions. I show eight bars in the present structure but have found four to be very satisfactory where the material was comparatively free of screenings, and I have no doubt that one would be sufficient under very favorable conditions.

The invention is easily applicable to cylindrical as distinguished from tapered or conical screens.

It is clear from what I have described that my structure can be considerably modified without departing from my invention. I show it in a multiple screen. It is clear that it is useful on either a single or multiple screen.

Having thus described my invention what I claim as new and desire to secure by Letters Patent is:

1. The combination with a rotary screen, of a cleaning device therefor comprising rings larger than the drum of said screen connected by longitudinal bars disposed to contact with the surface of the screen while it is being revolved, and projecting pins on the screen to locate the said cleaning rings, as specified.

2. In a multiple screen comprising concentric drums, one within the other, the combination of supporting rings on the internal screen of larger diameter than said screen and of lesser diameter than the outer screen and adapted to rest on the top of the internal screen, and longitudinal cleaning bars connecting the said rings, said rings and bars being relatively movable to the said screen drum.

3. The combination of a cylindrical rotary drum screen, and rings larger than said drum around the same and connected by longitudinal cleaning bars for contacting with the said screen, said rings and bars being relatively movable to the said screen drum, as specified.

4. The combination of a multiple screen comprising concentric rotary screen drums, one within the other, sets of rings for each drum, longitudinal cleaning bars connecting said rings of each set, said rings and bar being relatively movable to the said screen drum and the intermediate cleaning bars serving to assist the agitation of the contents, and suitable guides for maintaining said rings in place.

In witness whereof I have hereunto set my hand.

CARL SANDBERG.